R. M. WARREN.
ARMATURE FOR ELECTRICAL MACHINES.
APPLICATION FILED NOV. 22, 1913.

1,136,907.

Patented Apr. 20, 1915.

Witnesses

Inventor
Robert Mack Warren
By

UNITED STATES PATENT OFFICE.

ROBERT MACK WARREN, OF SUMTER, SOUTH CAROLINA, ASSIGNOR TO SUMTER ELECTRICAL COMPANY, OF SUMTER, SOUTH CAROLINA, A CORPORATION OF SOUTH CAROLINA.

ARMATURE FOR ELECTRICAL MACHINES.

1,136,907.      Specification of Letters Patent.      Patented Apr. 20, 1915.

Application filed November 22, 1913. Serial No. 802,421.

*To all whom it may concern:*

Be it known that I, ROBERT MACK WARREN, a citizen of the United States, residing at Sumter, in the county of Sumter and State of South Carolina, have invented certain new and useful Improvements in Armatures for Electrical Machines, of which the following is a specification, reference being had to the accompanying drawing.

My invention relates to armatures for electrical machines, and consists in certain improvements in the form of certain laminæ forming part of the core, and in the assembly of same.

Figure 1:
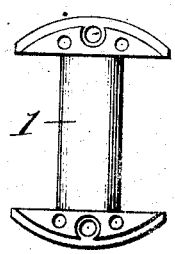
Figure 2:
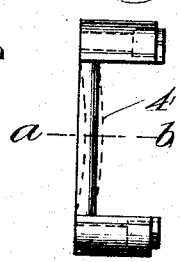
Figure 3:
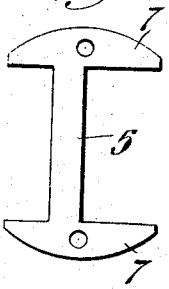
Figure 4:
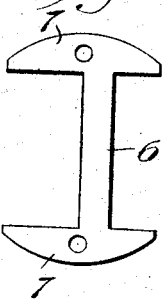
Figure 5:
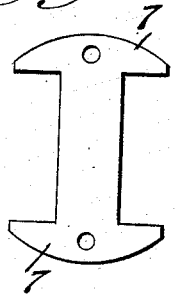
Figure 6:
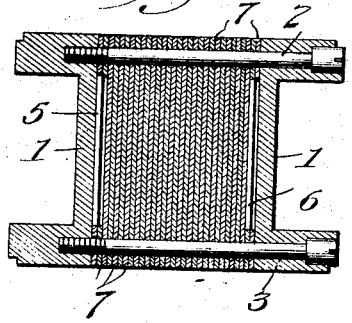
Figure 7:
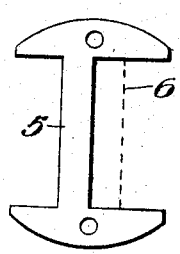
Figure 8:
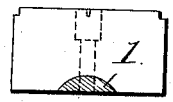
Figure 9:
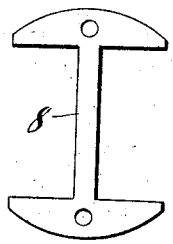
Figure 10:
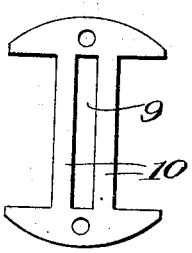

In the accompanying drawings, Figure 1 is a front view of the armature ends; Fig. 2, a side view of same; Fig. 3, a view of a lamina hereinafter referred to as left hand lamina; Fig. 4, a view of a lamina hereinafter referred to as a right hand lamina; Fig. 5, a view of a center lamina; Fig. 6, a view showing the various laminæ assembled with the ends. Fig. 7, a view illustrating the assembly of the laminæ shown in Figs. 3 and 4, Fig. 8, a cross section on the line *a b*, Fig. 2. Figs. 9 and 10 show modifications in the form of the center ribs of laminæ which may be used instead of those shown in Figs. 3, 4 and 5.

Like figures of reference denote the same parts wherever they are shown.

In armatures of this type, it is desirable that the ribs 1, which are embraced by the winding, be made as thin as possible. When these ribs are made of the desired thinness, and the core of the armature is built up of center laminations of the usual form as shown in Fig. 5, and the bolts 2 and 3 are used to secure the structure together, the ribs 1 will be forced outwardly as shown by the dotted line 4. This not only distorts the winding space, but also causes a considerable number of the ribs to break in assembly. Heretofore attempts have been made to remedy this trouble, by making the center ribs 1 substantial enough to clamp the laminations in place, and secondly, to pass a bolt through the center of the ribs and all the laminations; but either of these remedies considerably decrease the electrical efficiency of the armature. The first affects the efficiency by placing a large amount of material where it is embraced by the winding. The second is not only open to the same objection as the first, but also necessitates drilling and tapping the ribs 1.

An armature is assembled according to my improved method, by placing against one end piece shown in Fig. 1, a left hand lamina as shown in Fig. 3 and on top of this, a right hand lamina as shown in Fig. 4. It will be noted that the ribs 5 and 6 of these laminæ are not on top of each other, but lie side by side so that a free space equal in thickness to one lamina, exists when additional center laminæ are added.

Against the two laminæ shown in Figs. 3 and 4, are placed a sufficient number of center laminæ as shown in Fig. 5 until an armature of the desired length is obtained, whereupon, before the remaining end is placed in position, another pair of laminæ consisting of one right hand and one left hand piece, are placed in position as previously described.

It will be observed that two holes are formed through the ends 7 of all laminæ and end pieces and in these holes suitable bolts 2 and 3 are placed to secure the structure together, or same is secured in any other suitable manner.

It will now be observed that when the bolts are tightened, the ends are drawn together clamping the laminæ between them, and that on each end of the group of center laminæ there are two laminæ having their center ribs so formed that expansion of the center portion of the center laminæ is possible. The ribs 5 and 6 on each end of the core are accordingly squeezed more or less past each other, and allow for the bulging of the ribs of the center laminæ that would otherwise distort the ribs 1 of the cast ends.

I do not wish to limit myself to the particular form of laminæ here shown, but consider my invention to embrace broadly all modifications of the shape of some of the laminæ in an armature core that will permit the drawing together of the cast ends of an armature, without distorting the rib or center portion of said ends. Such a modification is shown in Figs. 9 and 10, which show modified forms of the end and center laminæ, respectively. The end lamina, Fig. 9 has a center rib 8, adapted to fit in the cut-out lamina shown in Fig. 10. It is obvious how this arrangement accomplishes the same result when assembled, as the laminæ shown in Figs. 3, 4 and 5.

Having thus described my invention, what I claim is new and desire to protect by Letters Patent, is—

1. In an armature for electrical machines, a central group of H-shaped laminæ having solid center ribs, a plurality of H-shaped laminæ on the ends of said central core, said last mentioned laminæ having center ribs of less width than the core laminæ and so disposed in relation to each other that when all of the laminæ are secured together the center ribs of the end laminæ are not materially distorted out of their normal place, substantially as described.

2. In an armature for electrical machines, end members having center ribs, a plurality of laminæ having center ribs of width equal to the center ribs of the end members, a plurality of laminæ having center ribs of less width than the first mentioned laminæ and adapted to permit expansion of the center ribs of the laminæ without permitting said center ribs to distort the ribs of the end members, and means for securing said laminæ and ends together.

3. In an armature for electrical machines, a central core of laminations having central ribs, end members having central ribs of substantially the same width as the ribs of the core laminæ, and a plurality of laminæ interposed between said core laminæ and said end members, said last mentioned laminæ having central ribs so disposed as to permit lateral expansion of the ribs of said core laminæ to take place without distorting the ribs of said end members, substantially as described.

In testimony whereof I hereunto affix my signature in the presence of two witnesses.

ROBERT MACK WARREN.

Witnesses:
H. R. VAN DEVENTER,
F. C. MANNING.

Copies of this patent may be obtained for five cents each, by addressing the "Commissioner of Patents, Washington, D. C."